(12) United States Patent
Chowdhury et al.

(10) Patent No.: US 6,949,197 B2
(45) Date of Patent: Sep. 27, 2005

(54) SITU NEUTRALIZATION OF SUBSURFACE ACIDIC PORE WATER

(75) Inventors: Ajit K. Chowdhury, Madison, WI (US); Terry Vandenbush, Madison, WI (US)

(73) Assignee: RMT, Inc., Madison, WI (US)

( * ) Notice: Subject to any disclaimer, the term of this patent is extended or adjusted under 35 U.S.C. 154(b) by 274 days.

(21) Appl. No.: 10/456,095

(22) Filed: Jun. 6, 2003

(65) Prior Publication Data

US 2004/0245185 A1 Dec. 9, 2004

(51) Int. Cl.[7] .................................................. C02F 1/66
(52) U.S. Cl. ...................... 210/747; 210/724; 210/749; 405/128.5; 405/128.75
(58) Field of Search ................................ 210/724, 747, 210/749, 752; 405/128.5, 128.75

(56) References Cited

U.S. PATENT DOCUMENTS 5,427,691 A * 6/1995 Kuyucak et al. ............ 210/713
6,254,312 B1 * 7/2001 Chowdhury et al. ........ 588/320
6,543,964 B2 * 4/2003 Chowdhury et al. ....... 405/128.5
2003/0165359 A1 * 9/2003 Chowdhury et al. ....... 405/128.5

FOREIGN PATENT DOCUMENTS

JP         60248288 A  * 12/1985    ............. C02F/1/62

OTHER PUBLICATIONS

Rehm, W.J., et al., "The Chemical Stabilization of Arsenic and Lead Using EnviroBlend at the Former Ashepoo Fertilizer Works, Charleston, SC," Second International Conference on Oxidation Toronto Ontario CA (2002).

* cited by examiner

Primary Examiner—Matthew O. Savage
(74) Attorney, Agent, or Firm—Quarles & Brady LLP

(57) ABSTRACT

A method for neutralizing in situ pore water associated with a subsurface waste material body, the pore water having a pH of less than 2, the method includes the steps of adding a non-carbonate alkali to the pore water to produce a pH-modified acidic pore water having a pH between about 4 and about 5; and adding a carbonate alkali to the pH-modified pore water in an amount sufficient to raise the pore water pH to between about 6 and about 8.

5 Claims, 1 Drawing Sheet

SITU NEUTRALIZATION OF SUBSURFACE ACIDIC PORE WATER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

Heavy metal-contaminated waste materials, such as those found in disposed industrial wastes, contaminated soil, and the like, are often contaminated with strong acids (e.g., $H_2SO_4$) having pH values of approximately 1.0 or less in associated pore water. This subsurface acidic pore water can be neutralized in situ by direct injection of an alkali. Neutralization controls mobility of heavy metals in the waste materials via ground water flow through the waste.

Typical in situ neutralization methods involve injecting an acid neutralizing agent comprising carbonates, such as $Na_2CO_3$, $NaHCO_3$, $CaCO_3$, $MgCO_3$, and the like, in the form of an alkaline solution or slurry. Such processes liberate large quantities of $CO_2$, thereby increasing down hole back pressure and requiring higher injection pressures. The liberated $CO_2$ finds preferential pathways to release a pent up excess subsurface pressure causing "daylighting" of the injected material.

To avoid daylighting issues associated with carbonate alkali injection, non-carbonate alkaline agents such as NaOH, $Ca(OH)_2$, and the like can be injected to neutralize the acidic pore water. However, injection of substantial quantities of strong alkaline agents can be problematic in that the pore water turns rapidly from strongly acidic to strongly alkaline. This is particularly undesired because a high pH increases solubility of emphoteric heavy metals and therefore increases the potential mobility of such metals. Alternative approaches to neutralizing subsurface acidic pore water in situ are desired.

BRIEF SUMMARY OF THE INVENTION

The present invention is summarized in that a process for neutralizing highly acidic subsurface pore water in situ includes the steps of adjusting the pH of the acidic pore water into a range from about 4 to about 5 with a non-carbonate alkali agent to produce a partially neutralized subsurface acidic pore water which is then contacted with limestone ($CaCO_3$) to bring the pH up to a generally neutral range of about 6 to about 8.

The present invention is further summarized in that the methods of the invention can be practiced on any acidic groundwater or wastewater contained in a tank or pressure vessel where it is desirable to neutralize the groundwater or wastewater while avoiding spillage.

It is an advantage of the invention that use of a non-carbonate alkali agent eliminates vigorous $CO_2$ gas generation associated with $CaCO_3$ neutralization in prior processes.

It is another advantage of the present invention that the $CaCO_3$ of pore water above a pH of about 4 generates $CO_2$ at a sufficiently slow rate that the generated $CO_2$ is dissipated by physico-chemical processes, such as absorption and diffusion that the pore water does not develop substantial back pressure in the subsurface waste body and the potential for day lighting is reduced or eliminated.

It is a feature of the present invention that the non-carbonate alkaline agents are not used for the entire neutralization process so that unintended and undesired overshooting of the target pH does not occur.

DETAILED DESCRIPTION OF THE INVENTION

Figure 1:
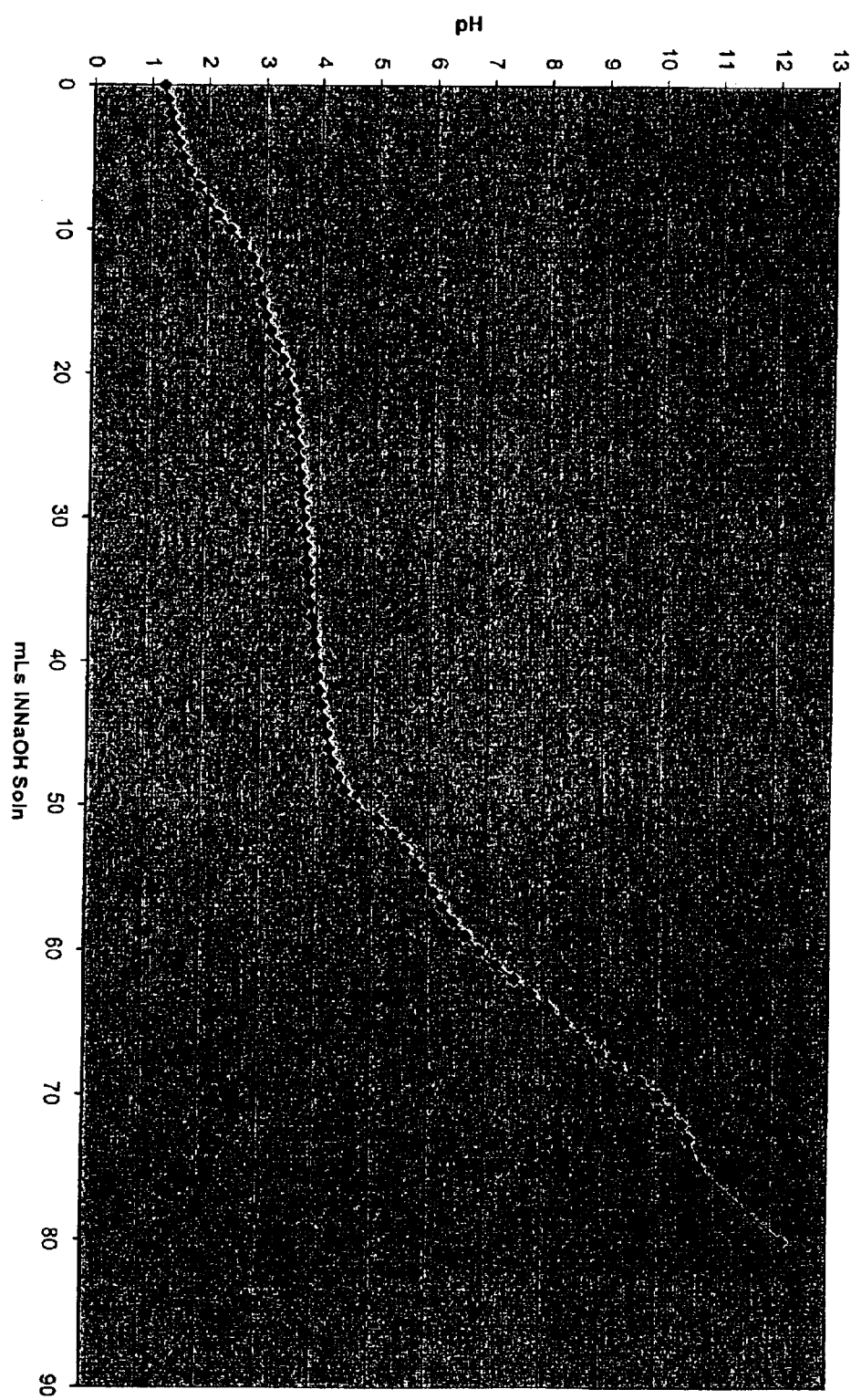
FIG. 1 depicts a pH titration of an acidic groundwater, from which one can calculate a suitable amount of 1N NaOH to employ in a simultaneous addition of non-carbonate and carbonate alkali agents.

The ratio and dosage of the non-carbonate alkali and the $CaCO_3$ can be determined accordingly to the present invention by measuring the initial pH and acidity of the pore water and then titrating the pore water with caustic solution and $CaCO_3$.

$CaCO_3$ is a preferred carbonate alkali useful in the final neutralization process because it reacts slowly with the partially neutralized acidic pore water and adds a long-term reserve of acid neutralization capacity (ANC) to the soil or waste material body associated with the pore water. $CaCO_3$ can be obtained from high calcium limestone, dolomitic limestone, water softening sludge, and other conventional sources. Other suitable carbonate alkali compounds for use in the final neutralization step include sodium and potassium carbonates and bicarbonates as well as $MgCO_3$.

Advantageously, since preferred non-carbonate alkali agents are highly reactive while the carbonate alkali agents are slowly reactive in the pore water, it is possible to add both agents simultaneously. Upon adding a suitable amount to bring the pH of the porewater to the desired level, the non-carbonate alkali agent will react quickly until expended without overshooting the target pH. Thereafter, the slow-acting carbonate alkali agent will continue to adjust the pH as noted, while providing long term pH buffering capacity. For this reason, the carbonate alkali agent can be added in large excess, whether or not the addition is simultaneous. More importantly, the amount of non-carbonate alkali should be determined to avoid overshooting the target pH. FIG. 1 depicts a pH titration of an acid groundwater, from which one can calculate a suitable amount of 1N NaOH to employ in a simultaneous addition of non-carbonate and carbonate alkali agents.

EXAMPLE

An acidic pore water having a pH of 1.2 and an acidity of 96,000 milligrams $CaCO_3$ per liter was neutralized with limestone alone or with a mix of 1N sodium hydroxide and limestone with the following results:

| VOLUME OF PORE WATER (mL) | ADDITIVES | pH AFTER 2 HOURS | OBSERVATIONS |
|---|---|---|---|
| 50 | 2 grams high calcium limestone | 2.1 | Severe foaming |

-continued

| VOLUME OF PORE WATER (mL) | ADDITIVES | pH AFTER 2 HOURS | OBSERVATIONS |
|---|---|---|---|
| 50 | 25 mL in NaOH + 2 grams high calcium limestone | 4.5 | Very little foaming |

We claim:

1. A method for neutralizing acid water selected from the group consisting of porewater, wastewater or groundwater, the water having a pH of less than 2, the method comprising the steps of:

adding a non-carbonate alkali to the water in an amount sufficient to produce a pH-modified acidic water having a pH between about 4 and about 5; and adding a carbonate alkali to the pH-modified acidic water in an amount sufficient to raise a pH of the pH-modified acidic water to between about 6 and about 8.

2. A method as claimed in claim 1 wherein the non-carbonate alkali and the carbonate alkali are added simultaneously.

3. A method as claimed in claim 1 wherein the non-carbonate alkali is selected from the group consisting of NaOH and $Ca(OH)_2$.

4. A method as claimed in claim 1 wherein the carbonate alkali is selected from the group consisting of $Na_2CO_3$, $NaHCO_3$, $CaCO_3$, $MgCO_3$ and potassium carbonate.

5. A method as claimed in claim 1 wherein the porewater is in situ pore water associated with a subsurface waste material body.

* * * * *